(12) United States Patent
Venhaus et al.

(10) Patent No.: US 8,866,348 B2
(45) Date of Patent: Oct. 21, 2014

(54) POWER SYSTEM CONTROLLING AND MONITORING POWER SEMICONDUCTOR DEVICES EMPLOYING TWO SERIAL SIGNALS

(75) Inventors: Greg J. Venhaus, Asheville, NC (US); Kenneth W. Balogh, Asheville, NC (US)

(73) Assignee: Eaton Corporation, Cleveland, OH (US)

( * ) Notice: Subject to any disclaimer, the term of this patent is extended or adjusted under 35 U.S.C. 154(b) by 521 days.

(21) Appl. No.: 13/299,533

(22) Filed: Nov. 18, 2011

(65) Prior Publication Data

US 2013/0128628 A1 May 23, 2013

(51) Int. Cl.
*G05F 3/06* (2006.01)

(52) U.S. Cl.
USPC .......................................... 307/151

(58) Field of Classification Search
USPC .......................................... 307/151
See application file for complete search history.

(56) References Cited

U.S. PATENT DOCUMENTS

| | | | |
|---|---|---|---|
| 5,963,440 A | 10/1999 | Gibbs et al. |
| 5,963,441 A | 10/1999 | Gibbs et al. |
| 6,046,917 A | 4/2000 | Gibbs et al. |
| 6,208,120 B1 | 3/2001 | Gibbs |
| 6,232,751 B1 | 5/2001 | Farr et al. |
| 6,388,248 B1 | 5/2002 | Gibbs et al. |
| 6,396,247 B1 | 5/2002 | Gibbs et al. |
| 6,407,926 B1 | 6/2002 | Walker et al. |
| 6,614,639 B1 | 9/2003 | Gibbs |
| 6,666,578 B2 | 12/2003 | Gibbs et al. |
| 6,704,214 B1 | 3/2004 | Gibbs et al. |
| 6,724,643 B1 | 4/2004 | Gibbs |
| 6,827,540 B2 | 12/2004 | Walker et al. |
| 6,946,602 B1 | 9/2005 | Gibbs et al. |
| 6,998,735 B2 | 2/2006 | Gibbs |
| 7,012,823 B2 | 3/2006 | Gibbs |
| 7,834,579 B2 | 11/2010 | Nojima |

*Primary Examiner* — Robert L. Deberadinis
(74) *Attorney, Agent, or Firm* — Eckert Seamans Cherin & Mellott, LLC; Kirk D. Houser

(57) ABSTRACT

A power system includes a power semiconductor devices; a control circuit outputting first firing signals each being for a corresponding power semiconductor device, and outputting first activation response signals each being associated with a corresponding power semiconductor device. A first interface circuit cooperates with the control circuit to input a first serial signal and output the first firing signals, and to input the first activation response signals and output a second serial signal. A second interface circuit cooperates with a controller to input the second serial signal, to output to the controller second activation response signals corresponding to the first activation response signals, to input from the controller second firing signals corresponding to the first firing signals, and to output the first serial signal. The controller controls the power semiconductor devices with the second firing signals, and monitors the power semiconductor devices with the second activation response signals.

13 Claims, 5 Drawing Sheets

POWER SYSTEM CONTROLLING AND MONITORING POWER SEMICONDUCTOR DEVICES EMPLOYING TWO SERIAL SIGNALS

BACKGROUND

1. Field

The disclosed concept pertains generally to systems employing semiconductor devices and, more particularly, to systems, such as, for example, power systems controlling or monitoring power semiconductor devices.

2. Background Information

Induction motor drives, also called alternating current (AC) drives, are used to control the speed and torque of multi-phase induction motors, which for a long time have been the workhorse of the industry.

AC drives can be divided into two categories: low-voltage and medium-voltage. The low-voltage AC drives are widely used and cover the 0 VAC to about 600 VAC range. Low-voltage AC drives are manufactured by almost five hundred companies around the world. Medium-voltage AC drives cover input line voltages above about 660 VAC and up to about 15,000 VAC. Only about a half-dozen known companies design and produce medium-voltage AC drives. High-voltage AC drives cover voltages of about 15,000 VAC and higher, but are very uncommon compared to low-voltage and medium-voltage AC drives. Recently, the auto industry and some other special applications providing low output voltage harmonics are considering the use of multi-level inverter bridges for low-voltage motors.

Until recently, power semiconductor switches were rated at a maximum of 1,700 V, which has allowed the low-voltage three-phase AC drives to use a six-switch inverter bridge. Today, state-of-the-art semiconductor switches are rated at 2,500 V, 3,300 V, 4,500 V, 6,500 V and can be used in a two-level, six-switch inverter bridge having up to a 2,000 VAC input. Above 2,000 VAC, the inverter bridge employs a greater number of power semiconductor switches connected in series. The most popular inverter topology for three-phase, medium-voltage induction motors of up to 4,000 V is a three-level, twelve-switch inverter bridge.

The number of levels in an inverter bridge defines the number of direct current (DC) voltage steps that are employed by the inverter bridge in order to achieve a certain voltage level in its output. Because power semiconductor switches have limited voltage capability, the total DC bus voltage of an inverter bridge is divided into a number of voltage steps, such that each voltage step can be handled by one power switch.

In a conventional two-level AC drive, three-phase AC power, after passing through an optional input line reactor, is rectified by a rectifier and capacitor to form a two-level DC bus. Depending on the design approach, input harmonics on the DC bus may be further reduced by a DC reactor. The two-level DC bus voltage is applied across a six-switch inverter bridge which produces a two-level PWM voltage output. The six switches are divided into three branches with two switches each. A controller controls each switch via the control terminals of each switch. A three-phase motor has a phase connection derived from the middle point between the two switches of a branch, and the three branches produce three phases which collectively drive the motor. The two levels of the DC bus constitute a positive bus and a negative bus. The top switch of each branch is connected to the positive bus and the bottom switch of each branch is tied to the negative bus. The two switches in a branch are in series and therefore cannot be turned-on at the same time without causing a short-circuit. In order to prevent a short-circuit, switch delay times are taken into consideration by the controller. The top switch needs to turn-off before the bottom one turns-on, and vice-versa. Each of the switches has to be able to handle the full voltage between the positive and negative busses.

In comparison to the two-level drive, in a three-level AC drive, the DC bus has three voltage levels (relatively labeled positive, neutral and negative), and the inverter bridge has twelve switches. The switches are divided into three equal branches, each branch connecting to one phase of the three-phase motor. Thus, each branch has four switches in series, and each connection to the motor is derived from a middle point.

A drawback of a three-level inverter bridge is that while a two-level inverter bridge requires only six semiconductor power switches, a three-level inverter bridge requires twelve switches, thereby increasing costs. These costs continue to increase as additional levels are utilized. For example, a four-level inverter bridge requires eighteen switches and a five-level inverter bridge requires twenty-four switches.

Further increasing costs result since as the number of levels and switches in the inverter bridge is increased, the complexity of controlling the switches also increases. The signals that drive the switches need to be carefully timed; otherwise, the switches may be damaged or destroyed. This complexity increases the costs of controllers used with multiple-level inverter bridges.

Known multi-level voltage source inverters employ two cables for activation of each power semiconductor device (e.g., without limitation, an IGBT). For example, these cables can be copper, but are typically fiber optic cables for noise immunity and isolation. One cable is employed for a signal to activate/fire the semiconductor device, and the other cable is employed to receive an activation response signal.

As the number of levels and devices increase, so does the number of wires or fibers. This problem worsens when multiple inverter bridges are employed for paralleling inverters, for redundant inverters, and in other situations where multiple inverters are employed. In a typical three-level drive, twenty-four fiber optic cables are employed for controlling and monitoring each inverter bridge. When two inverter bridges are employed, the number of fiber optic cables doubles. Furthermore, these fiber optic cables cannot transmit any data other than the firing pulses and the activation response signals for the inverter bridge.

FIG. 1 shows an inverter control and monitoring system 2 including a controller 4 having a controller module 5 and an inverter 6, such as a three-level inverter bridge. The inverter 6 is powered by a rectifier/capacitor DC bus 8 and powers a three-phase motor 10. The inverter 6 includes an IGBT assembly 12, which in this example includes twelve power semiconductor devices, such as IGBTs 14. Three example temperature sensors, such as the example RTDs 16, monitor temperatures of the IGBTs 14 for the three output phases. Although RTDs are disclosed, these may be another suitable temperature sensor, such as a thermocouple, or another suitable sensing device, not necessarily temperature related. Two isolated voltage sensors 18 monitor the voltage of the DC bus 8. Three current sensors, such as Hall current sensors 20, monitor the three-phase currents flowing between the inverter 6 and the motor 10. The sensed temperatures from the three RTDs 16 are communicated to the controller 4 by three or more cable connections 22. The sensed voltages from the two voltage sensors 18 are communicated to the controller 4 by two cable connections 24, and the sensed currents from the three Hall current sensors 20 are communicated to the controller 4 by three cable connections 26. Twelve control signals from the controller 4 to the IGBT assembly 12 are communicated using twelve fiber optic cables 28, and twelve monitoring signals to the controller 4 from the IGBT assembly 12 are communicated using twelve fiber optic cables 30. As such, there are 32 different connections between the controller 4 and the inverter 6.

Although a three-level inverter is discussed, the semiconductor devices 14 can be configured as, for example and without limitation, a two-level inverter or an inverter having four or more levels. The power semiconductor devices 14 can be, for example and without limitation, a plurality of IGBTs, a plurality of transistors, or other suitable power semiconductor electronic components.

There is room for improvement in systems controlling and monitoring power semiconductor devices.

SUMMARY

These needs and others are met by embodiments of the disclosed concept, which significantly reduce the number of connections (e.g., without limitation, copper and/or fiber optic cables; or cables) between a controller and a control circuit by combining multiple firing signals on a single connection, and multiple activation response signals on a single connection. This enables, for example and without limitation, a three-level inverter bridge to employ only two connections, one for sending and one for receiving. Subsequently, in one embodiment, each additional inverter bridge would only employ two connections. In addition, other data can be added for additional control, monitoring and/or configuration information without requiring additional connections.

The firing signals may be serialized at the controller and sent out in a serial data stream over a single connection. The serial data stream may be received at the control circuit, de-serialized, and sent to each individual power semiconductor device. Extra data can optionally be inserted in the serial data stream, extracted and processed at either the controller or the control circuit.

In accordance with one aspect of the disclosed concept, a power system comprises: a plurality of power semiconductor devices; a control circuit structured to output a plurality of first firing signals, each of the first firing signals being for a corresponding one of the power semiconductor devices, and to output a plurality of first activation response signals, each of the first activation response signals being associated with a corresponding one of the power semiconductor devices; a first interface circuit cooperating with the control circuit to input a first serial signal and output the first firing signals, and to input the first activation response signals and output a second serial signal; a controller; and a second interface circuit cooperating with the controller to input the second serial signal, to output to the controller a plurality of second activation response signals corresponding to the first activation response signals, to input from the controller a plurality of second firing signals corresponding to the first firing signals, and to output the first serial signal, wherein the controller is structured to control the power semiconductor devices with the second firing signals; and wherein the controller is further structured to monitor the power semiconductor devices with the second activation response signals.

The first interface circuit may comprise a serial decoder structured to input the first serial signal and output the first firing signals, and a serial encoder to input the first activation response signals and output the second serial signal; and the second interface circuit may comprise a serial decoder structured to input the second serial signal and output the second activation response signals, and a serial encoder to input the second firing signals and output the first serial signal.

The first interface circuit may be structured to output as part of the second serial signal a plurality of temperature values operatively associated with the power semiconductor devices, a plurality of current values operatively associated with the power semiconductor devices, and a plurality of direct current voltage values operatively associated with the power semiconductor devices.

The second interface circuit may be structured to output as part of the first serial signal a plurality of current thresholds for over-current sensing and a plurality of current control signals.

The first and second interface circuits may be structured to provide a packet protocol, in order to form a hybrid network capable of transferring real-time firing signals and real-time activation response signals between the controller and the control circuit.

The control circuit may be further structured, for a corresponding one of the first firing signals and for a corresponding one of the first activation response signals, to interrupt the corresponding one of the first firing signals when the corresponding one of the first activation response signals is active.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
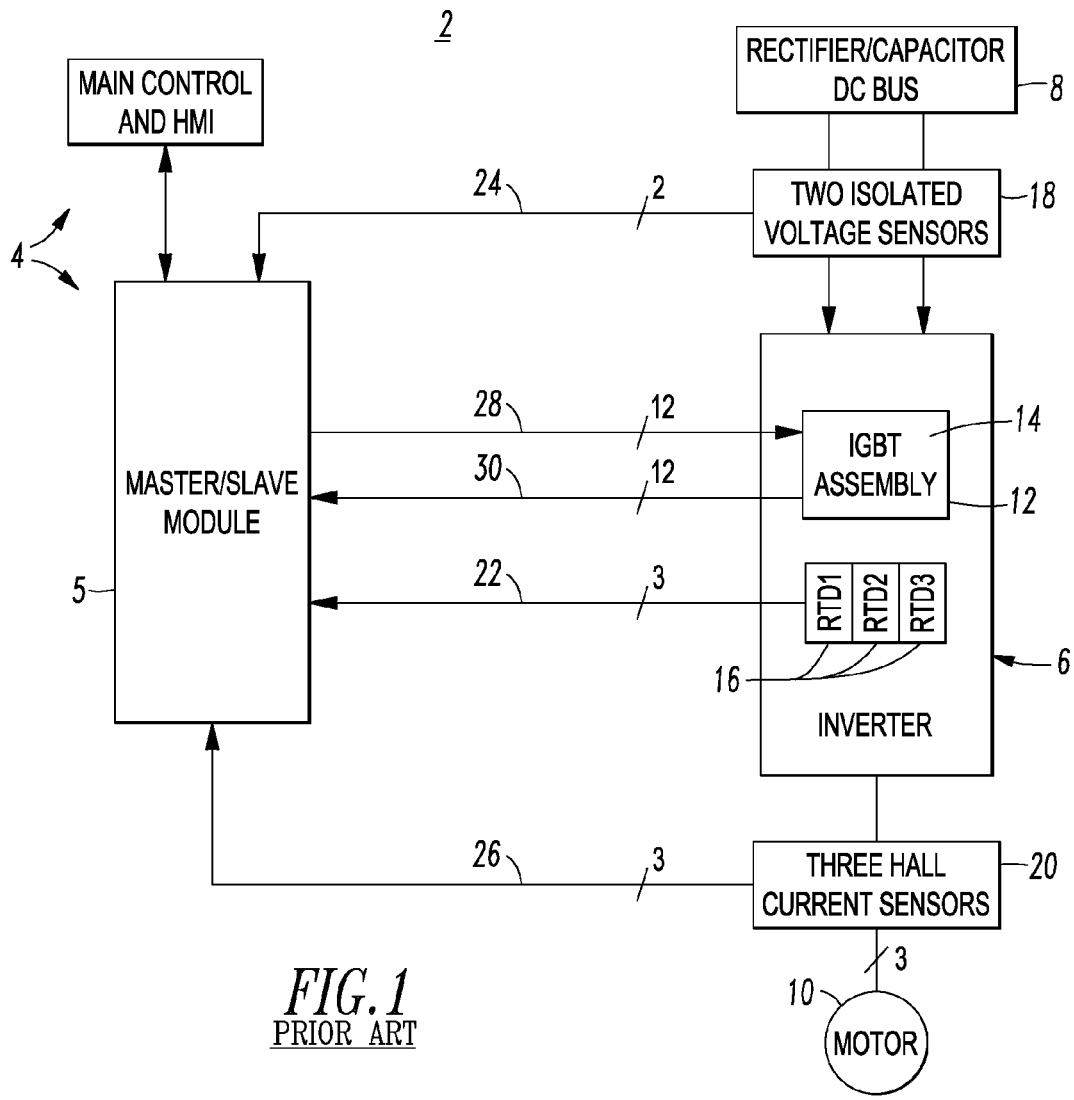
FIG. 1 is a block diagram of an inverter control and monitoring system.

As employed herein, the term "number" shall mean one or an integer greater than one (i.e., a plurality).

As employed herein, the term "processor" shall mean a programmable analog and/or digital device that can store, retrieve, and process data; a controller; a computer; a workstation; a personal computer; a digital signal processor; a microprocessor; a microcontroller; a microcomputer; a central processing unit; a mainframe computer; a mini-computer; a server; a networked processor; or any suitable processing or logic device or apparatus.

As employed herein, the term "inverter" shall mean an electrical device that converts direct current (DC) to alternating current (AC). The converted AC may be at any suitable voltage and frequency. This can be accomplished, for example and without limitation, with the use of transformers and switching and control circuits or another inverter. Inverters can be, for example and without limitation, single-level, multi-level, voltage source, or current source.

As employed herein, the term "drive controller" shall mean an electrical device such as, for example and without limitation, a two-level AC drive inverter bridge, that converts AC to DC to AC.

As employed herein, the term "two-level inverter" shall mean an electrical device that converts an alternating current to a direct current to an alternating current. A simple two-level inverter has two levels, although multi-level inverters can employ any plural number of levels.

A variable-frequency drive (VFD), for example, is a system for controlling the rotational speed of an AC electric motor by controlling the frequency of the electrical power supplied to the motor. A variable-frequency drive is a specific type of adjustable-speed drive. Variable-frequency drives are also known as adjustable-frequency drives (AFD), variable-speed drives (VSD), AC drives, microdrives or inverter drives. Since the voltage is varied along with frequency, these are sometimes also called VVVF (variable-voltage variable-frequency) drives.

As employed herein, the term "power semiconductor device" shall mean a power MOSFET, a JFET, an IGBT, a BJT or a thyristor, or a power semiconductor switching device employed in a variable-frequency drive, an induction motor drive, an alternating current drive, or an inverter bridge having a number of levels.

As employed herein, the term "firing signal" shall mean a signal employed to control a power semiconductor device.

As employed herein, the term "activation response signal" shall mean a signal employed to monitor a power semiconductor device.

As employed herein, the term "cable" shall mean a fiber optic cable, such as a cable including a number of optical fibers, or a cable including a number of electrical conductors.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with a particular power system, although the disclosed concept is applicable to a wide range of power systems, including, but not limited to, inverters and variable-frequency drives employing power semiconductor devices and a control and monitoring circuit operatively associated with the power semiconductor devices.

Figure 2:
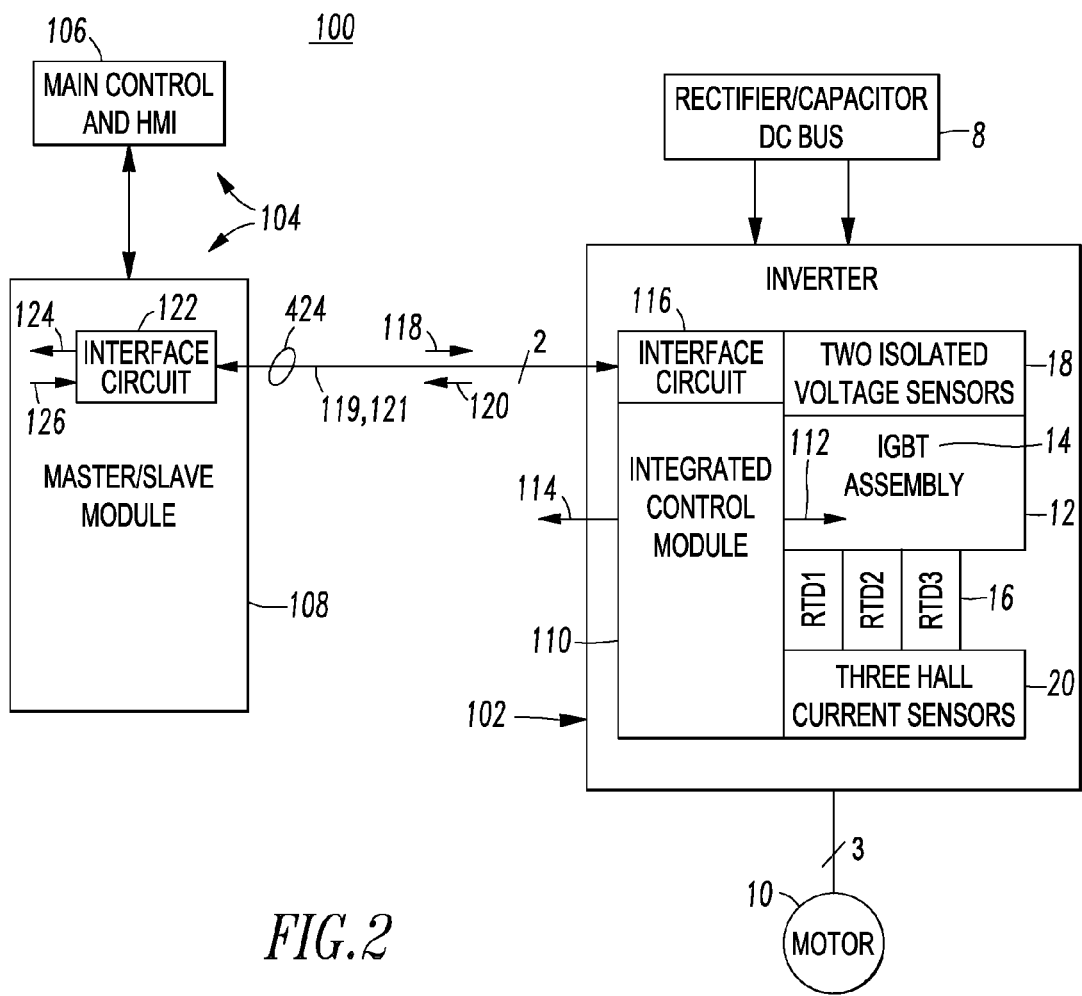
FIG. 2 is a block diagram of an inverter control and monitoring system in accordance with embodiments of the disclosed concept.

FIG. 2 shows a power system, such as the example inverter control and monitoring system 100 (e.g., without limitation, an inverter system, such as a variable-frequency drive). The system 100 includes an example inverter 102 and an example controller 104 having a main control and HMI (human machine interface) 106 and a controller module 108. As is conventional, the inverter 102 includes a plurality of power semiconductor devices 14 which are part of the example IGBT assembly 12. The inverter 102 also includes a control circuit, such as the example integrated control module 110, structured to output a plurality of first firing signals 112, each of the first firing signals 112 being for a corresponding one of the power semiconductor devices 14. The integrated control module 110 is also structured to output a plurality of first activation response signals 114, each of the first activation response signals 114 being associated with a corresponding one of the power semiconductor devices 14.

As will be discussed, below, in connection with FIG. 5, a first interface circuit 116 cooperates with the control circuit 110 to input a first serial signal 118 and output the first firing signals 112, and to input the first activation response signals 114 and output a second serial signal 120. A second interface circuit 122 of the controller module 108 cooperates with the controller 104 to input the second serial signal 120, to output to the controller 104 a plurality of second activation response signals 124 corresponding to the first activation response signals 114, to input from the controller 104 a plurality of second firing signals 126 corresponding to the first firing signals 112, and to output the first serial signal 118. The first and second serial signals 118,120 are communicated over a pair of fiber optic cables 119,121, which form the serial high speed communication link 424 of FIG. 5. The controller 104 is structured to control the power semiconductor devices 14 with the second firing signals 126. The controller 104 is further structured to monitor the power semiconductor devices 14 with the second activation response signals 124.

Figure 3:
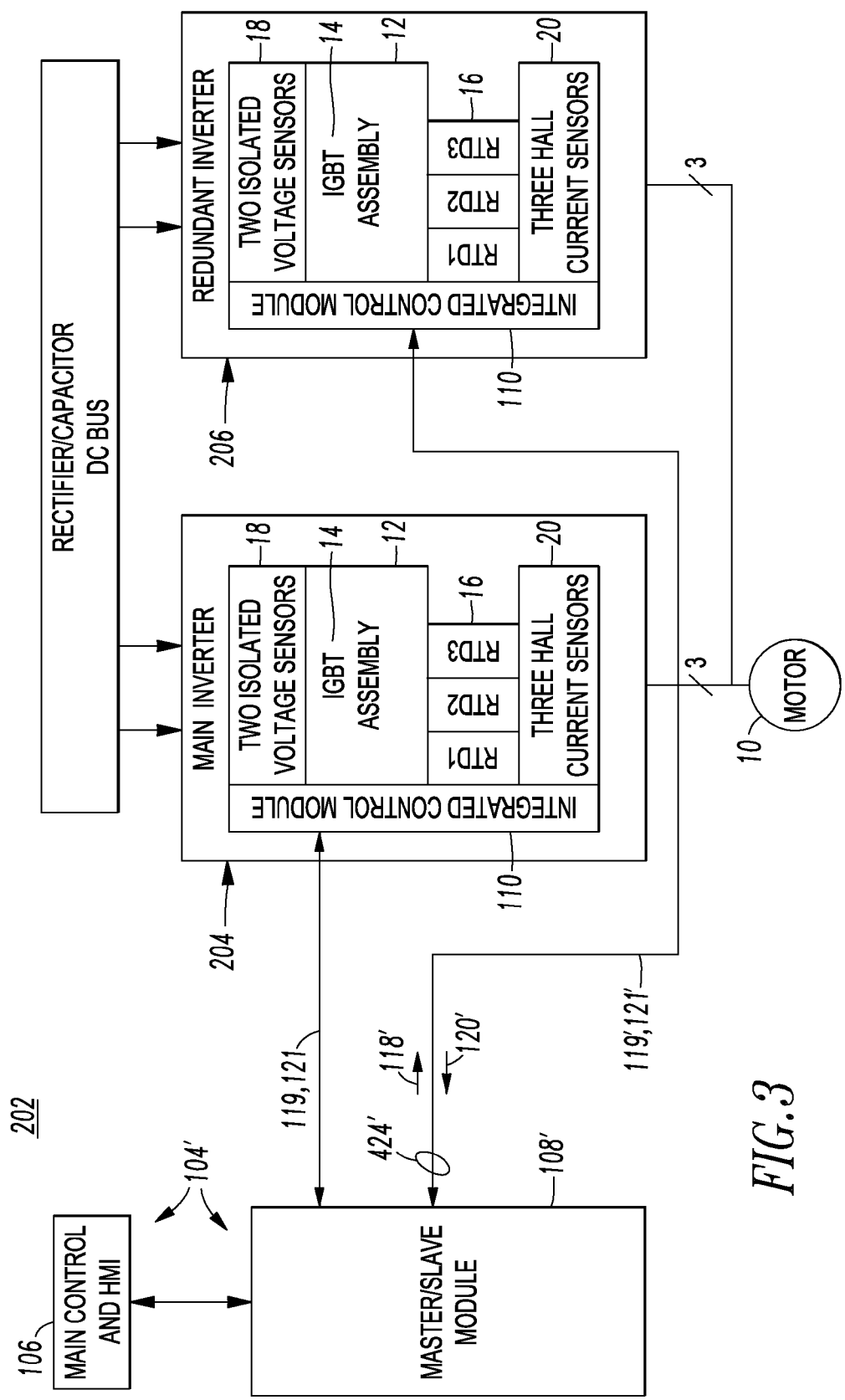
FIG. 3 is a block diagram of an inverter control and monitoring system for a redundant pair of inverters in accordance with an embodiment of the disclosed concept.

FIG. 3 shows an example inverter control and monitoring system 202 for a redundant pair of inverters 204,206. The system 202 includes an example controller 104' having the main control and HMI 106 of FIG. 2 and a controller module 108'. The module 108' is similar to the controller module 108 of FIG. 2 except that a second set of first and second serial signals 118',120' is communicated over a second pair of fiber optic cables 119',121', which form a second serial high speed communication link 424' between the module 108' and the second inverter 206.

Figure 4:
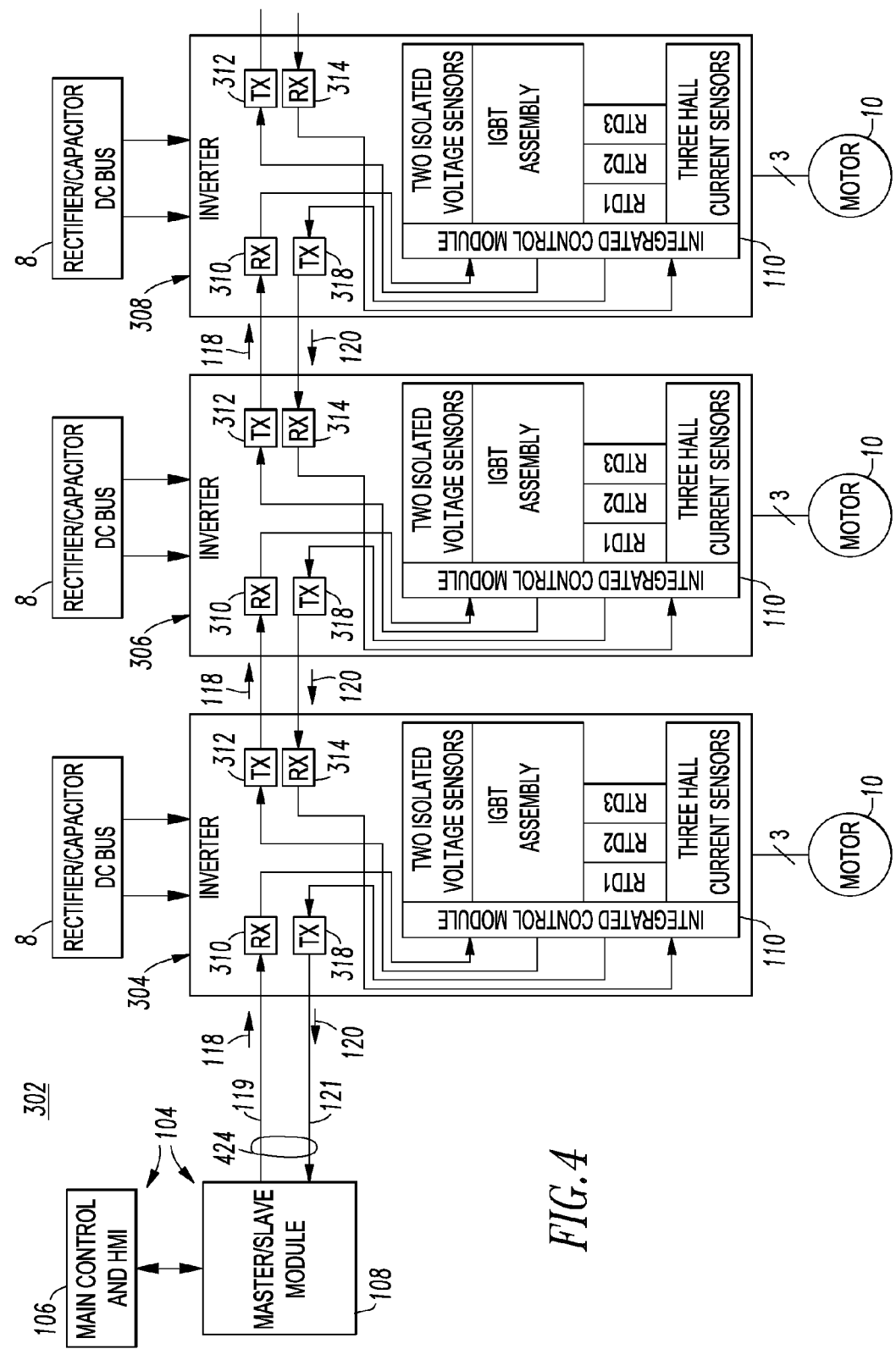
FIG. 4 is a block diagram of an inverter control and monitoring system for multiple inverters in accordance with another embodiment of the disclosed concept.

FIG. 4 shows an inverter control and monitoring system 302 for a plurality of inverters 304,306,308. Although three example inverters are shown, it will be appreciated that any suitable count (e.g., without limitation, two; four) of inverters can be employed. The system 302 includes the example controller 104 having the main control and HMI 106 and the controller module 108 of FIG. 2. For example and without limitation, for the three example inverters 304,306,308 and for the fiber optic cable 119, each inverter includes a first fiber optic receiver (RX) 310 and a first fiber optic transmitter (TX) 312, and for the other fiber optic cable 121, each inverter includes a second fiber optic receiver (RX) 314 and a second fiber optic transmitter (TX) 318. The first RX 310 provides a received signal to the integrated control module 110, which provides a transmit signal to the first TX 312 for the next inverter. The second RX 314 provides a received signal from the next inverter to the integrated control module 110, which provides a transmit signal to the second TX 318.

Figure 5:
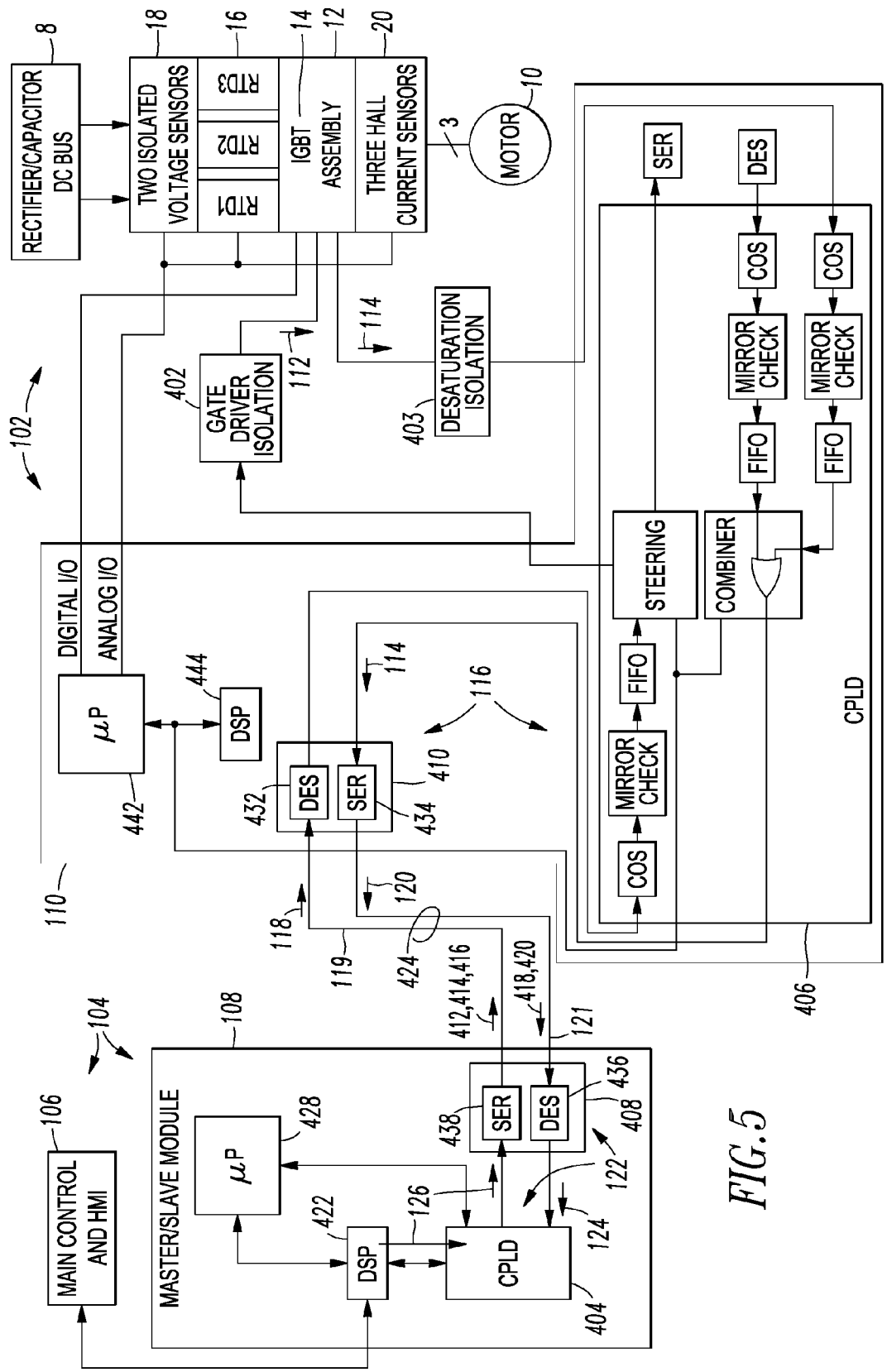
FIG. 5 is a block diagram of the controller and the integrated control module of FIG. 2.

FIG. 5 shows the controller module 108 and the integrated control module 110 of FIG. 2. The drive controller 104 and the drive control circuit 110 serialize and de-serialize the various firing pulse signals 112 and the various activation response signals 114 to and from the IGBT assembly 12.

Data is communicated between the controller module 108 and the integrated control module 110 with a suitable serial protocol using, for example and without limitation, a complex programmable logic device (CPLD) 404,406 and an N-bit serializer 408,410 at each end of the communication link 424. Alternatively, another suitable logic device, such as a FPGA or ASIC, can be employed. The N-bit serializers 408,410 are relatively high speed, relatively low-cost, robust communication sub-systems with integral synchronization and error checking. Preferably, the example N-bit serializers 408,410 provide sufficient bandwidth for application in, for example and without limitation, a real time video application.

EXAMPLE 1

Table 1 shows a non-limiting example of data communication messages from the controller module 108 to the integrated control module 110 for use in drives with up to four inverters. Table 2 shows a non-limiting example of data communication messages to the controller module 108 from the integrated control module 110 for use in drives with up to four inverters. The example bit rate used in the N-bit serializers 408,410 is preferably four orders of magnitude faster than the modulation carrier frequency of the drive. This bit rate results in suitably low jitter of the IGBT gate firing stream.

The serial data packets are structured into a frame sequence that is decoded by the CPLDs 404,406. For example, the CPLD 406 of the integrated control module 110 includes a change of state (COS) function, a mirror check function, a first-in first-out (FIFO) buffer, a steering function and a combiner function. The CPLD 406 preferably performs final synchronization of the gate firing pulses of the first firing signals 112 in order to ensure that proper dead times are observed. The COS function looks for the firing signals 112 (in the case of the controller module 108), or data coming back from the activation response signals 114 or data coming back from another inverter (as shown in FIG. 4) to change. Those changes drive interrupts (not shown) in the steering and combiner functions, in order that higher priority tasks related to the gate drivers are serviced first. Although not shown for simplicity of illustration, the CPLD 404 is similarly configured with the COS function, the mirror check function, the FIFO buffer, the steering function and the combiner function. An inverter IGBT gate driver isolation circuit 402 isolates CPLD logic signals of the steering function from the corresponding firing signals 112 to the IGBT assembly 12. An inverter activation response isolation circuit 403 isolates the activation response signals 114 from the IGBT assembly 12 to the corresponding CPLD logic signals of one of the corresponding COS function.

The CPLDs 404,406 run a state machine that is forced to an initial state by a special frame called FRAMESYNC (Tables 1 and 2). This packet is a dedicated frame of alternating ones and zeros.

The controller module (e.g., 108) begins by synchronizing the CPLD 406 in each inverter (e.g., 102). This is done by continuously sending sync frames, where each frame is sent with an alternating mirror bit and an inverted payload. A sync condition consists of two consecutive frames that have inverted payloads and a proper mirror bit. Non-mirrored data is latched on the rising edge of the mirror bit, while mirrored data is latched on the falling edge of the mirror bit.

The CPLDs 404,406 employ an N-bit length FIFO buffer (as shown with the CPLD 406) that is used to oversample the data packets. Valid data includes an un-mirrored and a mirrored mode for five consecutive packet pairs (or a "packet group"). This oversampling technique further ensures the integrity of the data and is employed for all context frames used in the example communication protocol.

As the inverter (e.g., 102) receives a good FRAMESYNC, it responds by sending a FRAMESYNC and mirror bits back to the controller module (e.g., 108). After the controller module receives proper FRAMESYNC signals from each inverter, it has verified that it has a good connection to all of its number of inverters.

Next, the controller module (e.g., 108) sends a gate driver packet (e.g., Inverted GateDriver of Table 1) to each inverter one inverter at a time. This includes a first message with non-inverted payload and mirror bit=0 and a second message with inverted payload and mirror bit=1. The controller module receives packet status data (e.g., Inverter1Desaturation of Table 2) from each inverter, and tracks the time it takes for the handshake.

If and when the controller module (e.g., 108) receives good packet status for all of its number of inverters, it then checks time stamp information to verify good time alignment of the gate firing signals. If the alignment is good, it then sends a firing sync packet (e.g., FiringSync1 of Table 1) to all of its number of inverters. This synchronizes the leading and trailing edges of the gate firing signal for five example inverters (e.g., FiringSync1, FiringSync2, FiringSync3, FiringSync4 and FiringSync5 of Table 1) within eight serial frame times.

The CPLD 404 of the controller module (e.g., 108) gives the gate firing packets a high priority. The gate firing signals are sent on odd packet groups, and the class-instance-attribute data (e.g., without limitation, control; status; configuration) are sent on even packet groups. This communication protocol interleaves time critical gate firing information with less time-critical status and control information. This is just one example communication strategy that can be employed; the packets can be sent in any suitable order. For example, the controller module and the inverter (e.g., 102) can process messages and packets in any suitable order, and the messages and packets can be sent in any suitable periodic, aperiodic, synchronous or asynchronous manner subject to the time criticality of the gate firing information to the inverter.

The CPLDs 404,406 decode the messages asynchronously by using the context information in each frame. This allows for seamless error checking of the messages by the controller (e.g., 104), which only looks for a match of the data coming back on the de-serializer (DES 436). The same FIFO oversampling and mirror function is also employed at the inverter end.

The class-instance-attribute data items (e.g., Inverter1ClassSpecifier; Inverter1InstanceSpecifier; Inverter1AttributeSpecifier) are employed to send configuration information to the inverters. The same oversampling technique is employed for the corresponding packet groups. The class-instance-attribute object model provides for an organized, relatively large quantity of configuration items for use in the system. These data items include eight messages including Specifier, Instance, Attribute and CRC messages (mirror bit=0), each followed by a corresponding inverted message (mirror bit=1).

Configuration information is read or written at a relatively slower rate and is not optimized for relatively fast transmission like the gate firing information or the de-saturation feedback. Because of this, an extra word for a CRC check and handshake is transmitted and received. This has no impact on the run-time performance of the drive.

The CPLDs 404,406 for transmit and receive of the data are configured to always give the gate firing information the highest priority, and to basically provide a direct access data path from the modulator in the controller module to the inverter. All other packets are automatically routed to generic I/O pins on the main processor (e.g., 442) of the inverter (e.g., 102), where they are processed in a less urgent manner.

In summary, a message sequence starts with a sync message, followed by the two gate firing messages (mirror bit=0 and mirror bit=1) that are interleaved between low priority status, control or configuration messages. A number of unique parameters may be sent interleaved with the gate firing signals for one inverter. In a multiple inverter configuration, all of the gate firing signals for a plurality of inverters are sent out in groups as contrasted with a single set of firing messages for one inverter. Those groups are similarly interleaved between low priority status, control or configuration messages for all of the inverters. Although the example message sequence starts with a sync message, the protocol is asynchronous and any context can be injected into the message stream without disturbing how the CPLDs interpret the other messages.

TABLE 1

| Serializer | | c5 | c4 | c3 | c2 | c1 | c0 | Parity | Bit 15 to Bit 0 Mirror |
|---|---|---|---|---|---|---|---|---|---|
| Special | FRAMESYNC | 1 | 0 | 1 | 0 | 1 | 0 | | NOTE 1 |
| 1 | Inverter1GateDriver | 0 | 0 | 0 | 0 | 0 | 1 | | NOTE 2 |
| 2 | Inverter2GateDriver | 0 | 0 | 0 | 0 | 1 | 0 | | NOTE 2 |
| 3 | Inverter3GateDriver | 0 | 0 | 0 | 0 | 1 | 1 | | NOTE 2 |
| 4 | Inverter4GateDriver | 0 | 0 | 0 | 1 | 0 | 0 | | NOTE 2 |
| 5 | Inverter5GateDriver | 0 | 0 | 0 | 1 | 0 | 1 | | NOTE 2 |
| 6 | Inverter1Class Specifier | 0 | 0 | 0 | 1 | 1 | 0 | | ObjectClass (Abs.MaxInverterCurrent = 10d) |
| 7 | Inverter1Instance Specifier | 0 | 0 | 0 | 1 | 1 | 1 | | ObjectInstance (All phases = 1d) |
| 8 | Inverter1AttributeSpecifier | 0 | 0 | 1 | 0 | 0 | 0 | | Attribute (Amperes 200 = 200d) |
| 9 | Inverter1CRC | 0 | 0 | 1 | 0 | 0 | 1 | | 16 Bit CRC for above items |
| 10 | Inverter1Handshake | 0 | 0 | 1 | 0 | 1 | 0 | | Handshake Bits TBD |
| 11 | Inverter2ClassSpecifier | 0 | 0 | 1 | 0 | 1 | 1 | | ObjectClass (Abs.MaxInverterCurrent =10d) |
| 12 | Inverter2InstanceSpecifier | 0 | 0 | 1 | 1 | 0 | 0 | | ObjectInstance (All phases = 1d) |
| 13 | Inverter2AttributeSpecifier | 0 | 0 | 1 | 1 | 0 | 1 | | Attribute (Amperes 200 = 200d) |
| 14 | Inverter2CRC | 0 | 0 | 1 | 1 | 1 | 0 | | 16 Bit CRC for above items |
| 15 | Inverter2Handshake | 0 | 0 | 1 | 1 | 1 | 1 | | Handshake Bits TBD |
| 16 | Inverter3ClassSpecifier | 0 | 1 | 0 | 0 | 0 | 0 | | ObjectClass |
| 17 | Inverter3InstanceSpecifier | 0 | 1 | 0 | 0 | 0 | 1 | | (Abs.MaxInverterCurrent = 10d) |
| 18 | Inverter3AttributeSpecifier | 0 | 1 | 0 | 0 | 1 | 1 | | ObjectInstance (All phases = 1d) |
| 19 | Inverter3CRC | 0 | 1 | 0 | 0 | 1 | 1 | | 16 Bit CRC for above items |
| 20 | Inverter3Handshake | 0 | 1 | 0 | 1 | 0 | 0 | | Handshake Bits TBD |
| 21 | Inverter4ClassSpecifier | 0 | 1 | 0 | 1 | 0 | 1 | | ObjectClass |
| 22 | Inverter4InstanceSpecifier | 0 | 1 | 0 | 1 | 1 | 0 | | (Abs.MaxInverterCurrent = 10d) |
| 23 | Inverter4AttributeSpecifier | 0 | 1 | 0 | 1 | 1 | 1 | | ObjectInstance (All phases = 1d) |
| 24 | Inverter4CRC | 0 | 1 | 1 | 0 | 0 | 0 | | 16 Bit CRC for above items |
| 25 | Inverter4Handshake | 0 | 1 | 1 | 0 | 0 | 1 | | Handshake Bits TBD |
| 26 | | 0 | 1 | 1 | 0 | 1 | 0 | | |
| 27 | FiringSync1 | 0 | 1 | 1 | 0 | 1 | 1 | | SyncFrameCounter1 |
| 28 | FiringSync2 | 0 | 1 | 1 | 1 | 0 | 0 | | SyncFrameCounter2 |
| . | FiringSync3 | | | | | | | | SyncFrameCounter3 |
| . | FiringSync4 | | | | | | | | SyncFrameCounter4 |
| 63 | FiringSync5 | 1 | 1 | 1 | 1 | 1 | 1 | | SyncFrameCounter5 |

TABLE 2

| Deserializer | | c5 | c4 | c3 | c2 | c1 | c0 | Parity | Bit 15 to Bit 0 Mirror |
|---|---|---|---|---|---|---|---|---|---|
| Special | FRAMESYNC | 1 | 0 | 1 | 0 | 1 | 0 | | NOTE 1 |
| 1 | Inverter1Desaturation | 0 | 0 | 0 | 0 | 0 | 1 | | NOTE 2 |
| 2 | Inverter2Desaturation | 0 | 0 | 0 | 0 | 1 | 0 | | NOTE 2 |
| 3 | Inverter3Desaturation | 0 | 0 | 0 | 0 | 1 | 1 | | NOTE 2 |
| 4 | Inverter4Desaturation | 0 | 0 | 0 | 1 | 0 | 0 | | NOTE 2 |
| 5 | Inverter5Desaturation | 0 | 0 | 0 | 1 | 0 | 1 | | NOTE 2 |
| 6 | Inverter1Class Specifier | 0 | 0 | 0 | 1 | 1 | 0 | | ObjectClass (Abs.MaxInverterCurrent = 10d) |
| 7 | Inverter1Instance Specifier | 0 | 0 | 0 | 1 | 1 | 1 | | ObjectInstance (All phases = 1d) |
| 8 | Inverter1AttributeSpecifier | 0 | 0 | 1 | 0 | 0 | 0 | | Attribute (Amperes 200 = 200d) |
| 9 | Inverter1CRC | 0 | 0 | 1 | 0 | 0 | 1 | | 16 Bit CRC for above items |
| 10 | Inverter1Handshake | 0 | 0 | 1 | 0 | 1 | 0 | | Handshake Bits TBD |
| 11 | Inverter2ClassSpecifier | 0 | 0 | 1 | 0 | 1 | 1 | | ObjectClass (Abs.MaxInverterCurrent = 10d) |
| 12 | Inverter2InstanceSpecifier | 0 | 0 | 1 | 1 | 0 | 0 | | ObjectInstance (All phases = 1d) |
| 13 | Inverter2AttributeSpecifier | 0 | 0 | 1 | 1 | 0 | 1 | | Attribute (Amperes 200 = 200d) |
| 14 | Inverter2CRC | 0 | 0 | 1 | 1 | 1 | 0 | | 16 Bit CRC for above items |
| 15 | Inverter2Handshake | 0 | 0 | 1 | 1 | 1 | 1 | | Handshake Bits TBD |
| 16 | Inverter3ClassSpecifier | 0 | 1 | 0 | 0 | 0 | 0 | | ObjectClass |
| 17 | Inverter3InstanceSpecifier | 0 | 1 | 0 | 0 | 0 | 1 | | (Abs.MaxInverterCurrent = 10d) |
| 18 | Inverter3AttributeSpecifier | 0 | 1 | 0 | 0 | 1 | 0 | | ObjectInstance (All phases = 1d) |
| 19 | Inverter3CRC | 0 | 1 | 0 | 0 | 1 | 1 | | 16 Bit CRC for above items |
| 20 | Inverter3Handshake | 0 | 1 | 0 | 1 | 0 | 0 | | Handshake Bits TBD |
| 21 | Inverter4ClassSpecifier | 0 | 1 | 0 | 1 | 0 | 1 | | ObjectClass |
| 22 | Inverter4InstanceSpecifier | 0 | 1 | 0 | 1 | 1 | 0 | | (Abs.MaxInverterCurrent = 10d) |
| 23 | Inverter4AttributeSpecifier | 0 | 1 | 0 | 1 | 1 | 1 | | ObjectInstance (All phases = 1d) |
| 24 | Inverter4CRC | 0 | 1 | 1 | 0 | 0 | 0 | | 16 Bit CRC for above items |
| 25 | Inverter4Handshake | 0 | 1 | 1 | 0 | 0 | 1 | | Handshake Bits TBD |
| 26 | | 0 | 1 | 1 | 0 | 1 | 0 | | |
| 27 | Return Sync1 | 0 | 1 | 1 | 0 | 1 | 1 | | SyncFrameCounter1 |

TABLE 2-continued

| Deserializer | | c5 | c4 | c3 | c2 | c1 | c0 | Parity | Bit 15 to Bit 0 Mirror |
|---|---|---|---|---|---|---|---|---|---|
| 28 | ReturnSync2 | 0 | 1 | 1 | 1 | 0 | 0 | | SyncFrameCounter2 |
| . | ReturnSync3 | | | | | | | | SyncFrameCounter3 |
| . | ReturnSync4 | | | | | | | | SyncFrameCounter4 |
| 63 | ReturnSync5 | 1 | 1 | 1 | 1 | 1 | 1 | | SyncFrameCounter5 |

NOTE 1:
Bit 11 to Bit 0 = 1 0 1 0 1 0 1 0 1 0 1 0
NOTE 2:
Bit 11 to Bit 0 = UNU UNL VNU VNL WNU WNL UPU UPL VPU VPL WPU WPL

Some examples for data communication messages of Table 1 follow. As a non-limiting example, there are 64 potential context messages of the serial protocol defined by 6 bits (c5 to c0), a payload of 16 bits, a mirror bit, and a parity bit for N=24, although a wide range of values of N can be employed. Non-limiting example data communication messages include: (1) a gate firing message 412 to the integrated control module 110 (e.g., without limitation, including, as part of the example payload, 12 bits for 12 gate firing signals as shown following Table 2); (2) a control message 414 to the integrated control module 110; (3) a configuration message 416 to the integrated control module 110; (4) a status message 418 (e.g., current, voltage, temperature) from the integrated control module 110; and (5) a status message 420 including the IGBT de-saturation signals (the first activation response signals 114) from the integrated control module 110 (e.g., without limitation, including, as part of the example payload, 12 bits for 12 activation response signals as shown following Table 2).

During normal operation, the controller module 108 develops a gate firing strategy based on frequency information provided by the main control and HMI module 106. The digital signal processor (DSP) 422 of the controller module 108 provides space-vector or another suitable modulation scheme conversion of an amplitude/phase vector provided by the module 106. This information is employed to create a gate firing sequence for all of the IGBTs 14 (e.g., without limitation, three phases and four IGBTs per phase in a three-level inverter configuration employ twelve firing signals) in one inverter, such as 102.

In the disclosed concept, the gate firing signals 126 are multiplexed on the serial high speed communication link 424. In contrast, in a conventional drive control scheme (e.g., FIG. 1), IGBT firing signals are provided over the twelve fiber optic cables 28. The CPLD 404 in the controller module 108 ensures that the DSP 422 gets priority access to the communication link 424, in order that time critical gate firing information is sent to the inverter's integrated control module 110 in a timely manner. The CPLD 404 ensures that the gate firing information is properly transmitted, checked for accuracy, and handshaked. The CPLD 404 yields to the main processor (μP) 428 between critical gate firing packets, in order that the μP 428 can send and receive relatively less time critical data (e.g., without limitation, phase currents; temperatures; I/O status; configuration information). The flow of gate firing information is handled totally by the transmitting and receiving CPLDs 404,406.

In a conventional drive control scheme (e.g., FIG. 1), IGBT de-saturation signals are provided over the twelve fiber optic cables 30. The controller module 5 of the controller 4 interrupts the gate firing sequence to protect the IGBTs 14 from damage in response to the de-saturation signals. In contrast, in the disclosed concept, the de-saturation signals, which are the activation response signals 114, for all twelve of the example IGBTs 14 are multiplexed and sent back to the controller module 108, but interruption of the firing sequence is handled by the integrated control module 110 in the steering function. The combiner function reads the various activation response signals 114 and that information is used by the steering function to terminate a number of the firing signals 112 (e.g., when a corresponding one of the activation response signals 114 has an active (lit) status and the corresponding firing signal 112 is also active). This improves system performance by eliminating the delays associated with program execution speed in the controller module 108. All of the presets (e.g., without limitation, for de-saturation; over-current) are sent over the serial link 424 during a configuration phase at power-up.

Along with hardware error checking provided by the CPLDs 404,406, the protocol layer residing in the N-bit serializers 408,410 provides additional error checking. The "mirror" bit (Table 1) is contained in each communication packet to indicate that the content of that packet has inverted logic. Before each packet is passed from the CPLD 406 to be consumed by the integrated control module 110, it needs to be received in both a non-inverted and an inverted format. In a relatively simple, but efficient, error checking scheme, the content of these two packets will cancel-out each other if each packet was received un-corrupted. The likelihood of receiving two corrupted packets in succession where all example 48 bits (for two packets) are exact mirror copies of each other is relatively very low. Furthermore, the addition of a parity bit in the packet provides another layer of protection. The parity bit indicates an even or odd number of bits that have been set to a logic state of 1. It will be appreciated that a wide range of other error checks (e.g., without limitation, a 16 bit CRC; N bit serializer) can alternatively be employed.

Certain communication messages over the communication link 424 can be employed for specialized control functions. For example and without limitation, context 63 (Table 1) is a "sync" message designed to coordinate firing in multiple inverter systems. There are also messages that provide for synchronizing watch-dog timers used by the controller module 108 and the integrated control module 110.

The first interface circuit 116 includes a serial decoder 432 structured to input the first serial signal 118 and output the first firing signals 112, and a serial encoder 434 to input the first activation response signals 114 and output the second serial signal 120. The second interface circuit 122 includes a serial decoder 436 structured to input the second serial signal 120 and output the second activation response signals 124, and a serial encoder 438 to input the second firing signals 126 and output the first serial signal 118.

Each of the example power semiconductor devices 14 is an IGBT including a collector-to-emitter junction. The IGBT assembly 12 outputs the first activation response signals 114. One of the first activation response signals 114 is active when a voltage across the IGBT collector-to-emitter junction of a corresponding one of the power semiconductor devices 14 is less than a predetermined value. The IGBT assembly 12 includes a circuit that monitors the voltage drop across the various IGBT collector-to-emitter junctions. If the voltage exceeds a pre-determined amount, then this is an indication that the IGBT is either seeing excessive current, or is not completely turned on (de-saturated). A proper level of saturation is reflected by the corresponding one of the first activation response signals 114 having an active (lit) status.

EXAMPLE 2

The example power semiconductor devices 14 form a three-level drive. The plurality of first firing signals 112 are twelve first firing signals, and the plurality of first activation response signals 114 are twelve first activation response signals. A three-level drive, for example, has twelve firing pulses and twelve activation response signals. This drive has three distinct voltage levels on the DC link: zero, plus, and minus. There are three phases in the three-level drive. Each output phase of this drive can be connected to one of those three levels. Four IGBTs per phase connect and isolate those three levels. Four IGBTs per phase in three phases provides twelve total IGBTs.

The first interface circuit 116 is structured to output as part of the second serial signal 120 a plurality of temperature values operatively associated with the power semiconductor devices 14 as sensed by the RTDs 16, a plurality of current values operatively associated with the power semiconductor devices 14 as sensed by the current sensors 20, and a plurality of direct current voltage values operatively associated with the power semiconductor devices 14 as sensed by the voltage sensors 18.

The second interface circuit 122 is structured to output as part of the first serial signal 118 a plurality of current thresholds for over-current sensing and a plurality of current control signals.

The first and second interface circuits 116,122 are structured to provide a packet protocol over the communication link 424, in order to form a hybrid network capable of transferring real-time firing signals and real-time activation response signals between the controller 104 and the control circuit 110.

The disclosed concept can employ "extra data" in the serial data streams over the communication link 424. For example, the data stream coming back from the drive control circuit 110 to the controller 104 can include, for example and without limitation, three phases of temperature data, three phases of current information, and two DC bus measurements. Also, the controller 104 can pass configuration information to the drive control circuit 110, in order that pre-set current thresholds for over-current sensing and current control for synchronous transfer systems are off-loaded to the drive control circuit 110. This improves system performance and un-burdens the main drive controller 104.

EXAMPLE 3

The example serial decoders 432,436 and serial encoders 434,438 are SERDES hardware. The example drive controller 104 and the example drive control circuit 110 include the SERDES hardware and the CPLDs 404,406 for glue logic. The example SERDES hardware can provide a packet protocol that is decoded by the CPLDs 404,406 on each side of the communication link 424, in order to form a hybrid network capable of transferring real-time firing and status information, and additionally act as a relatively high speed communications link between the drive controller 104 and the drive control circuit 110. The SERDES hardware is marketed by Pericom Semiconductor Corporation of San Jose, Calif. The SERDES (SERializer/DESerializer) translates an n-bit parallel bus into a differential serial stream, and receives a differential serial stream and converts it back to an n-bit parallel bus.

EXAMPLE 4

The example integrated control module 110 includes µP 442 for input/output of analog and digital I/O, such as the example sensed voltages, temperatures and currents. The module 110 also includes a DSP 444 that is employed to provide extra processing power needed to alter the firing sequence at the inverter.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof

What is claimed is:

1. A power system comprising:
   a plurality of power semiconductor devices;
   a control circuit structured to output a plurality of first firing signals, each of said first firing signals being for a corresponding one of said power semiconductor devices, and to output a plurality of first activation response signals, each of said first activation response signals being associated with a corresponding one of said power semiconductor devices;
   a first interface circuit cooperating with said control circuit to input a first serial signal and output said first firing signals, and to input said first activation response signals and output a second serial signal;
   a controller; and
   a second interface circuit cooperating with said controller to input said second serial signal, to output to said controller a plurality of second activation response signals corresponding to said first activation response signals, to input from said controller a plurality of second firing signals corresponding to said first firing signals, and to output said first serial signal,
   wherein said controller is structured to control said power semiconductor devices with said second firing signals; and
   wherein said controller is further structured to monitor said power semiconductor devices with said second activation response signals.

2. The power system of claim 1 wherein said first interface circuit comprises a serial decoder structured to input said first serial signal and output said first firing signals, and a serial encoder to input said first activation response signals and output said second serial signal; and wherein said second interface circuit comprises a serial decoder structured to input said second serial signal and output said second activation response signals, and a serial encoder to input said second firing signals and output said first serial signal.

3. The power system of claim 1 wherein each of said power semiconductor devices is an IGBT including a collector-to-emitter junction; wherein said control circuit comprises a circuit to input said first activation response signals; and wherein one of said first activation response signals is active when a voltage across the IGBT collector-to-emitter junction of a corresponding one of said power semiconductor devices is less than a predetermined value.

4. The power system of claim 1 wherein said power semiconductor devices form a three-level drive; wherein said plurality of first firing signals are twelve first firing signals; and wherein said plurality of first activation response signals are twelve first activation response signals.

5. The power system of claim 1 wherein said first interface circuit is structured to output as part of said second serial signal a plurality of temperature values operatively associated with said power semiconductor devices, a plurality of current values operatively associated with said power semiconductor devices, and a plurality of direct current voltage values operatively associated with said power semiconductor devices.

6. The power system of claim 1 wherein said second interface circuit is structured to output as part of said first serial signal a plurality of current thresholds for over-current sensing and a plurality of current control signals.

7. The power system of claim 1 wherein said first and second interface circuits are structured to provide a packet protocol, in order to form a hybrid network capable of transferring real-time firing signals and real-time activation response signals between said controller and said control circuit.

8. The power system of claim 1 wherein said power system is an inverter system.

9. The power system of claim 8 wherein said inverter system is a variable-frequency drive.

10. The power system of claim 1 wherein said control circuit is further structured, for a corresponding one of said first firing signals and for a corresponding one of said first activation response signals, to interrupt the corresponding one of said first firing signals when the corresponding one of said first activation response signals is active.

11. The power system of claim 1 wherein said first and second interface circuits are structured to transfer real-time firing signals from said controller to said control circuit, and to transfer non-real-time signals between said controller and said control circuit.

12. The power system of claim 11 wherein said non-real-time signals are selected from the group consisting of class-instance-attribute data, status signals, control signals and configuration signals.

13. The power system of claim 11 wherein said first and second interface circuits are structured to employ odd packet groups and even packet groups; wherein said real-time firing signals are transferred in one of said odd and even packet groups; and wherein said non-real-time signals are transferred in the other one of said odd and even packet groups.

* * * * *